US008854388B2

(12) United States Patent
Ishikawa

(10) Patent No.: US 8,854,388 B2
(45) Date of Patent: Oct. 7, 2014

(54) IMAGE PROCESSING APPARATUS AND MEMORY MANAGEMENT METHOD FOR IMAGE PROCESSING APPARATUS

(75) Inventor: Akira Ishikawa, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 1219 days.

(21) Appl. No.: 12/485,782

(22) Filed: Jun. 16, 2009

(65) Prior Publication Data

US 2009/0315903 A1 Dec. 24, 2009

(30) Foreign Application Priority Data

Jun. 19, 2008 (JP) ................. 2008-160769

(51) Int. Cl.
*G06F 13/00* (2006.01)
*G06F 12/02* (2006.01)
*G09G 5/36* (2006.01)
*H04N 1/32* (2006.01)
*H04N 1/00* (2006.01)

(52) U.S. Cl.
CPC .... *H04N 1/32101* (2013.01); *H04N 2201/0091* (2013.01); *H04N 1/00954* (2013.01); *H04N 2201/3274* (2013.01); *H04N 2201/3202* (2013.01); *H04N 1/00912* (2013.01)
USPC ............................ 345/537; 345/543; 345/557

(58) Field of Classification Search
USPC ................. 345/530, 536, 537, 543, 544, 557
See application file for complete search history.

(56) References Cited

U.S. PATENT DOCUMENTS

| 6,298,404 | B1 * | 10/2001 | Mishra .......................... 710/100 |
| 7,496,722 | B2 * | 2/2009 | Thelen .......................... 711/158 |
| 7,571,076 | B2 * | 8/2009 | Matsuzaki et al. ............ 702/182 |
| 8,250,306 | B2 * | 8/2012 | Larkby-Lahet et al. ...... 711/133 |
| 2004/0193855 | A1 * | 9/2004 | Kacevas et al. ............... 712/237 |
| 2007/0255428 | A1 * | 11/2007 | Nagata .............................. 700/8 |

FOREIGN PATENT DOCUMENTS

| JP | 2000-184157 A | 6/2000 |
| JP | 2004-227188 A | 8/2004 |
| JP | 2008-097425 A | 4/2008 |
| JP | 2009-020555 A | 1/2009 |

* cited by examiner

*Primary Examiner* — Joni Richer
(74) *Attorney, Agent, or Firm* — Canon USA Inc IP Division

(57) ABSTRACT

An image processing apparatus has a plurality of functions and is capable of executing a job relating to any of the plurality of functions. The image processing apparatus includes a memory management unit to secure a storage region in a first storage device for program execution, a save unit to save information from the storage region in the first storage device to a second storage device, a history recording unit to record a history relating to execution of the job each time the image processing apparatus executes the job, and a save restriction unit to restrict saving of information from the storage region in the first storage device to the second storage device in order to execute a job relating to a function which is specified based on a job history recorded by the history recording unit from among the plurality of functions.

8 Claims, 11 Drawing Sheets

FIG. 7

| HIGH-FREQUENCY PROCESS LIST |
|---|
| PROCESS NAME |
| SCAN PROCESS |
| PRINT PROCESS |
| FAX PROCESS |
| IMAGING PROCESS |
| RENDERING PROCESS |

FIG. 8

| JOB LOG | |
|---|---|
| JOB NAME | TIME |
| COPY | 2008,04,16,18:25 |
| FAX_TX | 2008,04,16,18:24 |
| PDL | 2008,04,16,15:13 |
| COPY | 2008,04,16,15:10 |

| JOB PROCESS TABLE ||
|---|---|
| JOB NAME | PROCESS NAME |
| COPY | SCAN PROCESS |
|  | PRINT PROCESS |
|  | IMAGING PROCESS |
| PDL | PRINT PROCESS |
|  | IMAGING PROCESS |
|  | RENDERING PROCESS |
| ⋮ | ⋮ |

IMAGE PROCESSING APPARATUS AND MEMORY MANAGEMENT METHOD FOR IMAGE PROCESSING APPARATUS

BACKGROUND OF THE INVENTION

1. Field of the Invention

The present invention relates to a memory management technique in an image processing apparatus employing a virtual memory system.

2. Description of the Related Art

An information processing apparatus and an image processing apparatus which employ a virtual memory system can manage a memory region (address space) with a capacity which is greater than that of a real memory (physical memory).

When the memory region which is greater than the real memory capacity is managed by the virtual memory system, swap processing is performed in which some of the data and programs stored in the memory are temporarily saved to a storage device such as a hard disk drive (HDD). Swap processing can be broadly divided into the following two kinds of processing. One is "swapping out", which refers to writing currently contents not currently being used in the real memory to the HDD or the like to free up the real memory. The other is "swapping in", in which the saved contents written on the hard disk etc. are written back into the memory when such contents are to be used to process a program.

When swapped out contents in a storage region of the HDD are to be transferred back to the real memory region to be used by a central processing unit (CPU), transfer overhead may occur in a process using the swapped memory, and the operation of the program may be slowed.

To improve throughput of an entire computer system, a technique is known in which swap priority of a process which is partially swapped out is set higher than that of a currently-executed process (Japanese Patent Application Laid-Open No. 2004-227188).

Further, a function which protects a specific memory region from being swapped is provided in a general-purpose operating system (OS) such as Linux®.

Functions of image processing apparatuses, such as a multifunction peripheral (MFP) which includes a plurality of functions such as copying, printing, scanning, and faxing, are being diversified each year. Thus, the amount of programs (processes) installed on the MFP to realize such plurality of functions also continues to increase. Installing a real memory which secures a memory region with a capacity large enough to avoid occurrence of swapping when the MFP simultaneously executes processes may not be practical from a cost perspective. Therefore, an operation may have to be performed by swapping out the memory used by some of the processes.

However, in an MFP having various functions such as scanning, printing, copying, and faxing, the process having the higher execution priority may change depending on a use environment.

For example, if an MFP in which a printing function is prioritized over other functions and a memory region relating thereto is restricted to prevent swapping, is used by a user who mainly uses a scanning function, an operation of a program for controlling the scanning function may be slowed such that scanning function throughput decreases. Similarly, an improvement in throughput would not be expected for an environment in which a facsimile sending function is mainly used.

Therefore, a system having a wide range of functions cannot improve throughput by uniformly determining a priority function.

SUMMARY OF THE INVENTION

According to an aspect of the present invention, an image processing apparatus is provided which has a plurality of functions and which is capable of executing a job relating to any of the plurality of functions. The image processing apparatus includes a program execution unit capable of executing a program for the image processing apparatus to execute the job, a memory management unit configured to secure a storage region in a first storage device for the program execution unit to execute the program, a save unit configured to save to a second storage device, information stored in the storage region secured by the memory management unit in the first storage device, and a history recording unit configured to record a history relating to execution of the job each time the image processing apparatus executes the job. The image processing apparatus also has a save restriction unit configured to restrict saving of information in the storage region secured by the memory management unit in the first storage device to a storage region of the second storage device in order to execute a job relating to a function which is specified based on a job history recorded by the history recording unit from among the plurality of functions.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 7 illustrates an example of a high-frequency process list.

FIG. 8 illustrates an example of a job log.

FIG. 9 illustrates an example of a job process table.

DETAILED DESCRIPTION OF THE EMBODIMENTS

Various exemplary embodiments, features, and aspects of the invention will be described in detail below with reference to the drawings.

While an image processing apparatus is used as an example, the present invention can be applied to computer systems in general.

Figure 1:
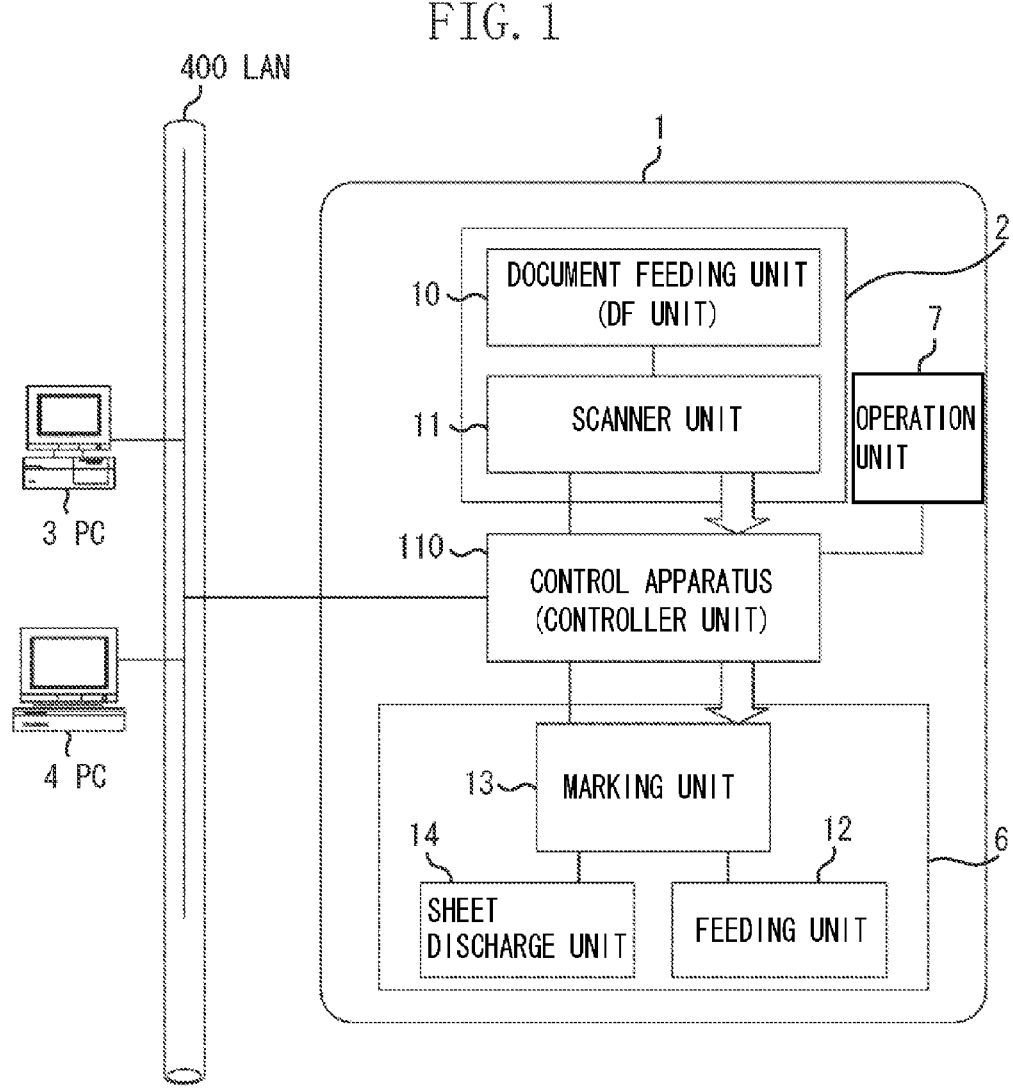
FIG. 1 illustrates an example of a schematic configuration of an image processing apparatus.

FIG. 1 illustrates an example of a schematic configuration of an image processing apparatus in a first exemplary embodiment of the present invention.

In the present exemplary embodiment, an image processing apparatus 1 is an MFP which includes a plurality of functions such as copying, scanning, faxing, and printing.

The image processing apparatus 1 is connected to personal computers (PC) 3 and 4 via a local area network (LAN) 400 such as an Ethernet®.

The image processing apparatus 1 has a reader unit 2 which reads a document image, a printer unit 6 which prints and outputs image data, and an operation unit 7 which includes a liquid crystal panel for displaying the image data and an operation screen.

A controller 110 connects and controls each of the above-described components, and performs overall control of the entire image processing apparatus 1.

The reader unit 2 has a document feeding unit 10 which conveys a document sheet, and a scanner unit 11 which optically reads the document image and converts the read image into the image data as an electric signal.

The printer unit 6 has a feeding unit 12 which includes a multi-stage feeding cassette storing recording paper, and a marking unit 13 which transfers and fixes the image data on the recording paper. The printer unit 6 also has a sheet discharge unit 14 which performs sorting and stapling processing on the printed recording paper, and externally discharges the resultant recording paper.

Figure 2:
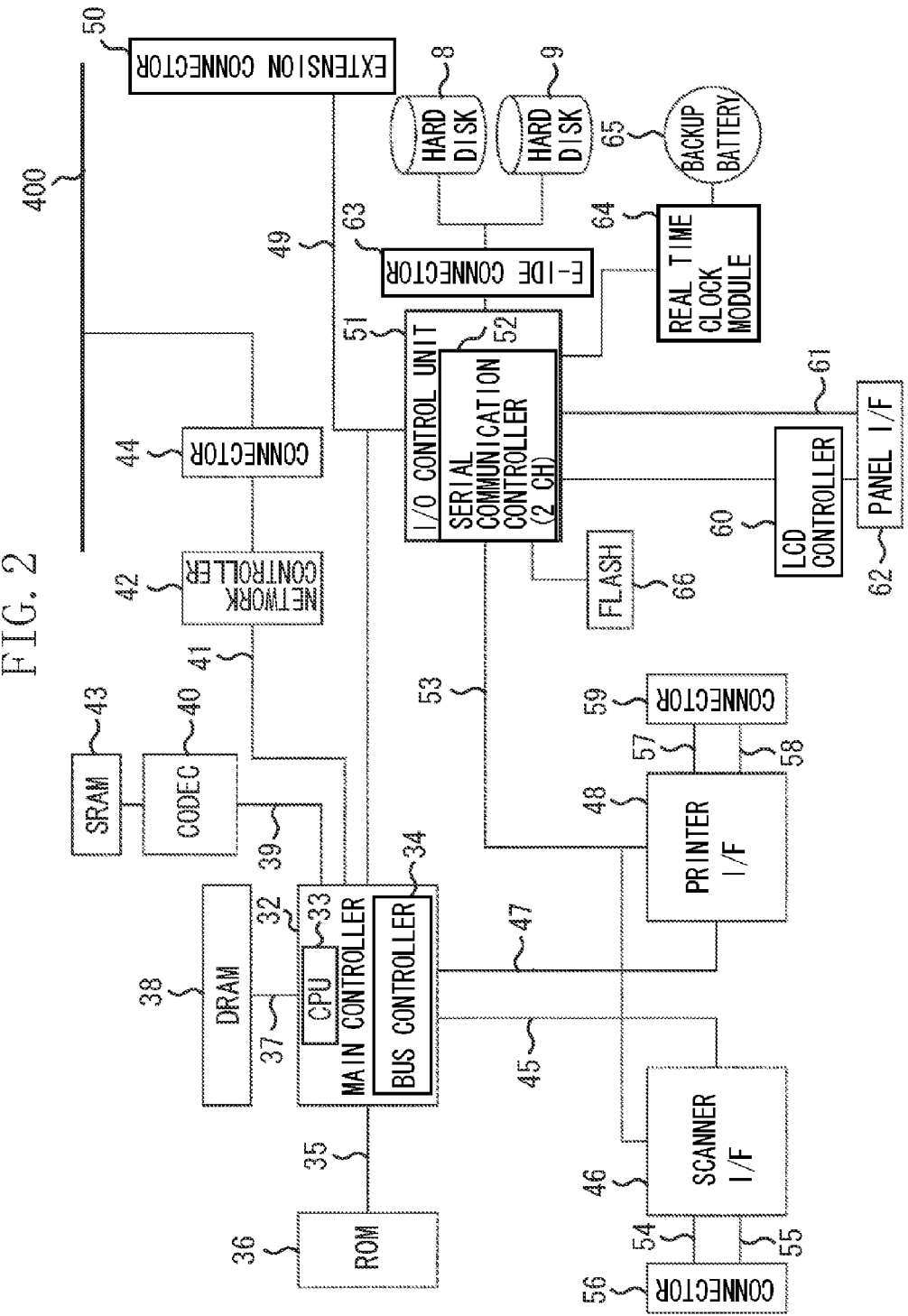
FIG. 2 illustrates an example of hardware blocks in a controller unit of the image processing apparatus.

FIG. 2 illustrates an example of the hardware blocks in the controller 110.

A main controller 32 includes a CPU 33, a bus controller 34, and function blocks including various controller circuits described below.

The main controller 32 is connected to a read-only memory (ROM) 36 via a ROM interface (ROM I/F) 35 and to a dynamic random access memory (DRAM) 38 via a DRAM I/F 37.

The main controller 32 is also connected to a coder decoder (CODEC) 40 via a CODEC I/F 39, and to a network controller 42 via a network I/F 41.

The ROM 36 stores various control programs and calculation data executed by the CPU 33 of the main controller 32. The DRAM 38, as an example of a first storage device (main storage device), is used as a work area for the CPU 33 to operate in and as a storage area for the image data. The CODEC 40 compresses raster image data stored in the DRAM 38 by a conventional compression method such as Modified Huffman (MH)/Modified READ (MR)/Modified MR (MMR)/and Joint Bi-level Image Experts Group (JBIG), and decompresses the compressed data into a raster image. Further, a static RAM (SRAM) 43 is connected to the CODEC 40. The SRAM 43 is used as a temporary work area for the CODEC 40.

The network controller 42 is connected to the LAN 400 via a network connector 44.

Further, the main controller 32 is connected to a scanner I/F 46 via a scanner bus 45, and to a printer I/F 48 via a printer bus 47. In addition, the main controller 32 is connected to an extension connector 50 for connecting to an extension board via a multipurpose high-speed bus 49 such as a peripheral component interconnect (PCI) bus, and to an input/output control unit (I/O control unit) 51.

The I/O control unit 51 includes two channels of a start stop synchronization type serial communication controller 52 for sending and receiving control commands among the reader unit 2 and the printer unit 6.

The serial communication controller 52 is connected to the scanner I/F 46 and the printer I/F 48 via an I/O bus 53.

The scanner I/F 46 is connected to a scanner connector 56 via a first start stop synchronization serial I/F 54 and a first video I/F 55. The scanner connector 56 is also connected to the scanner unit 11 (FIG. 1) of the reader unit 2. Further, the scanner I/F 46 performs binary processing and variable magnification processing in a main scanning direction and/or a sub-scanning direction on the image data received from the scanner unit 11. Further, the scanner I/F 46 generates a control signal based on a video signal transmitted from the scanner unit 11, and transfers the generated control signal to the main controller 32 via the scanner bus 45.

The printer I/F 48 is connected to a printer connector 59 via a second start stop synchronization serial I/F 57 and a second video I/F 58. The printer connector 59 is also connected to the marking unit 13 (FIG. 1) of the printer unit 6. Further, the printer I/F 48 performs image processing such as smoothing processing on the image data output from the main controller 32, and outputs the processed image data to the marking unit 13. Further, the printer I/F 48 outputs a control signal generated based on a video signal transmitted from the marking unit 13 to the printer bus 47.

The CPU 33 executes a program read from the ROM 36 via the ROM I/F 35. Alternatively, the CPU 33 executes a program which is stored in a hard disk drive (HDD) 8 or 9, and loaded in the DRAM 38. The CPU 33 is an entity which may execute the program for processing according to the below-described flowcharts. For example, the CPU 33 interprets page description language (PDL) data received from host computers 3 and 4, and rasterizes the raster image data.

The bus controller 34 controls transfer of data which is input and output from and to external devices connected to the scanner I/F 46, the printer I/F 48, the extension connector 50 and the like. The bus controller 34 performs arbitration during bus competition and controls transfer of direct memory access (DMA) data. For example, data transfer between the DRAM 38 and the CODEC 40, data transfer from the scanner unit 11 to the DRAM 38, and data transfer from the DRAM 38 to the marking unit 13 are controlled by the bus controller 34.

The I/O control unit 51 is connected to a panel I/F 62 via a liquid crystal device (LCD) controller 60 and a key input I/F 61. The panel I/F 62 is connected to the operation unit 7 (FIG. 1).

Further, the I/O control unit 51 is connected to a flash memory 66 as a non-volatile memory region. The I/O control unit 51 is also connected to the HDDs 8 and 9 which are an example of a second storage device via an enhanced integrated drive electronics (E-IDE) connector 63. The HDDs 8 and 9 are secondary storage devices in which the programs executed by the CPU 33 and the image data are stored. The program stored in the HDDs 8 and 9 is loaded into the DRAM 38, and the CPU 33 executes the program which is loaded into the DRAM 38. Although the present exemplary embodiment has two hard disk drives, HDDs 8 and 9, the present invention is not limited to this number. Further, the present invention may include a Redundant Arrays of Inexpensive Disks (RAID) constructed from a plurality of hard disk drives. Further, the HDD 8 or 9 may be replaced with some other non-volatile storage device. For example, a solid state disk (SSD) may be used. In the present exemplary embodiment, the DRAM 38 requires shorter time to read and write data than the HDD 8 or 9.

Further, the I/O control unit 51 is connected to a real time clock module 64 for updating and saving date and time which are managed in a device.

The real time clock module 64 is connected to a backup battery 65, and is backed up by the backup battery 65.

Next, the module configuration of a program relating to memory control will be described using FIG. 3.

Figure 3:
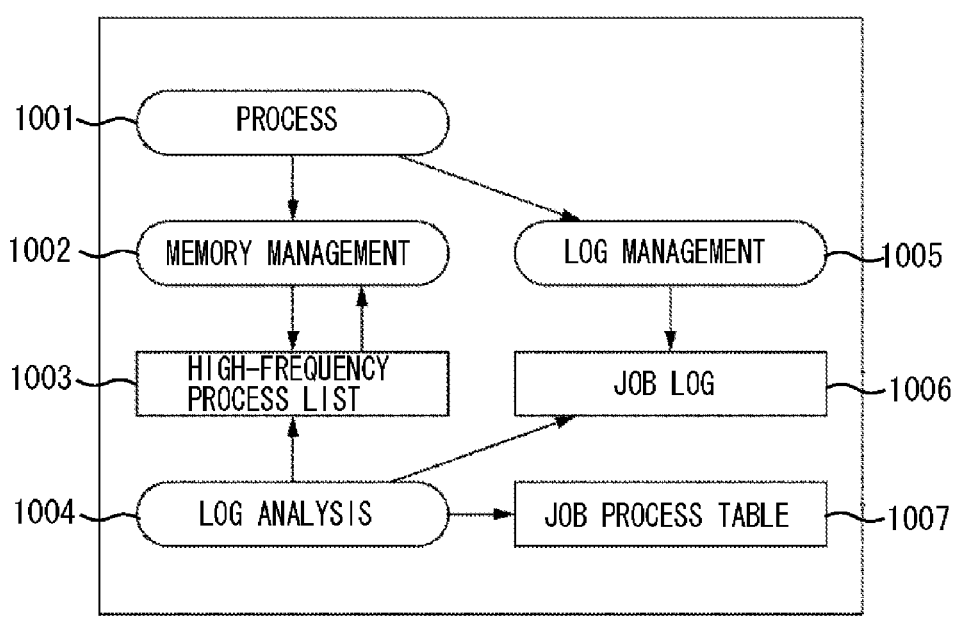
FIG. 3 illustrates an example of a program module relating to memory control of the image processing apparatus.

FIG. 3 illustrates an example of a program module relating to the memory control of the image processing apparatus.

A process 1001, memory management 1002, log analysis 1004, and log management 1005 are programs that may be previously stored in the ROM 36 or the HDDs 8 and 9. The CPU 33 executes the program which is read into the DRAM 38 in units of a process from the ROM 36 or the HDDs 8 and 9.

The process 1001 is a unit of processing of a program which is executed to control the image processing apparatus. In one version, a plurality of processes 1001 may exist, and the CPU 33 can execute a plurality of processes to control jobs of the various functions (e.g., copying, printing, FAX, scanning etc.) included in the image processing apparatus 1.

When the CPU 33 requires a work memory region to execute the process 1001, the CPU 33 can acquire a part of the DRAM 38. Hereinbelow, unless otherwise noted, the term "memory region" refers to a storage region in the DRAM 38. The CPU 33 can execute the plurality of processes. When a free space in the DRAM 38 is insufficient due to the plurality of processes acquiring the memory region in the DRAM 38, data (i.e., information in the memory region which a certain process secures in the DRAM 38 is temporarily saved on the HDDs 8 and 9 to secure the free space in the DRAM 38. This action of writing data from a certain memory region onto the hard disk or the like to free up the capacity of the real memory (DRAM 38) is referred to as "swapping out". On the other hand, writing the data saved on the hard disk or the like back into the DRAM 38 when such data is to be used for program processing is referred to as "swapping in". Data (i.e., information) which may be saved on the HDD from the DRAM 38 and written back into the DRAM 38 from the HDD by swapping out and swapping in can include programs and the data used by the programs.

In the present exemplary embodiment, although Linux® is used as the OS for operating these programs, other multitask OS having a virtual memory management system may also be used.

In a system having a plurality of functions like the image processing apparatus of the present exemplary embodiment, module robustness and reusability is generally realized by dividing processes as a boundary among modules. By appropriately dividing processes, the image processing apparatus 1 can have processes corresponding to each function. When a job which uses a certain function is executed, the CPU 33 can execute the process corresponding to that function. If the processes are divided up into parts, a single function can be realized by combining a plurality of processes.

The process 1001 may notify the log management 1005 each time a job is executed.

The memory management 1002 can provide a memory region which can be secured in the DRAM 38 to the process 1001.

The process 1001 may acquire the memory region for execution from the memory management 1002.

There are two types of memory region in the DRAM 38 that may be provided by memory management 1002, a swap-out restricted memory region and a normal memory region.

In the present exemplary embodiment, for convenience, the swap-out restricted memory region is a high-speed memory region, and the normal memory region which accepts swapping out is a low-speed memory region. The high-speed memory region is a region which may be subjected to save restriction for the HDD 8 or 9.

The memory management 1002 can create a low-speed memory region which is managed by the OS by a memory map (mmap) system call (e.g., in the case of Linux) prepared by the OS for the process to acquire a memory region.

The memory management 1002 can create a high-speed memory restricted to prevent swapping out by adding a swap-restricted attribute to the low-speed memory which may be a normally acquired memory, using a memory lock (mlock) system call which is a function for notifying the OS that the region is restricted to prevent swapping out.

When the OS detects that there is no free region in the DRAM 38, the OS searches for a memory region which is suitable for performing swapping out from among the entire memory region. Since the high-speed memory set with a swap-out restricted attribute is excluded from a target when the OS searches for the swap target memory regions, the high-speed memory is not swapped out. On the other hand, since the normal low-speed memory which is not set with the swap-out restricted attribute is a target when the OS searches for the swap target memory regions, the low-speed memory may be swapped out based on a determination made by the OS. Since size distribution of the high-speed memory and the low-speed memory may not be uniquely determined at a system design stage, the memory management 1002 can create the high-speed memory on request and provide it to the process 1001.

The memory management 1002 can dynamically set the above described two memory regions based on a high-frequency process list 1003.

The memory management 1002 may determine whether a process is a high-frequency process by confirming a name of an acquired process. In one version, since the memory management 1002 may operate as a library program embedded in the process 1001, the memory management 1002 can specify a name of a process which requests the memory region by querying the OS about its own process name.

The high-frequency process list 1003 can register processes which are specified as being frequently executed by the log analysis 1004. A specific example is illustrated in FIG. 7. The high-frequency process list 1003 may be stored in either the HDD 8, the HDD 9, or the flash memory 66 of the image processing apparatus 1.

In the high-frequency process list in FIG. 7, names of frequently executed processes are listed. In one version, the high-frequency processes may be expressed as an array of character strings of the process names. Methods for managing the high-frequency process list 1003 can include a method which discards old high-frequency processes every time the list is updated, and a method which keeps the old high-frequency processes when the list is updated. The management method may be designated by, for example, a user or an administrator.

In the method which discards the old high-frequency processes every time log analysis is performed, the high-frequency process list 1003 is overwritten with the high-frequency processes at that point. In this case, although memory management can be realized while immediately responding to fluctuations in the usage of the user, when an unorthodox and sudden operation is performed, it may occur that the memory management may temporarily have poorer efficiency. On the other hand, in the method which keeps the old high-frequency processes, registration on the high-frequency process list 1003 is managed by generation, so that a combination of new high-frequency processes and the high-frequency processes of the previous generation may be registered in the high-frequency process list 1003.

The log analysis 1004 may specify the high-frequency processes by analyzing a job log 1006 and confirming with a job process table 1007, and may register the specified processes in the high-frequency process list 1003.

Although the high-frequency processes reflecting usage are based on the usage of the user, an unused system typically does not have a usage history. For use at this stage, the high-frequency process list may be created, for example, from processes selected during design. The log analysis 1004 may be performed at predetermined timing or at timing arbitrarily set by, for example, the user or the administrator of the image processing apparatus. The timing may be set for example at a designated time after execution of each job.

If the analysis is performed after execution of each job, it may be possible that the user can operate under an environment in which the latest usage can always be reflected to memory control.

On the other hand, since a chance that the analysis will be performed simultaneously with the execution of another normal job may be relatively high, the execution speed of the normal job can decrease.

If the analysis is performed at the designated time, the user can designate a time period which does not disturb the execution of the normal job. As a result, it may be possible that the function can be used without decreasing the execution speed of the normal job.

On the other hand, if the analysis is performed during the night, for example, the user may not be able to operate under an environment in which memory control is optimized to usage until the following day or later. For example, for an environment in which business processes fluctuate on a daily basis, such a method may mean that throughput cannot be suitably improved.

The log management 1005 can record in the job log 1006 that a job was executed based on a message from the process 1001.

The job log 1006 is a list, as illustrated for example in FIG. 8, in which a job execution history registered from the log management 1005 is recorded. The job log 1006 may be stored in either the HDD 8, the HDD 9, or the flash memory 66 of the image processing apparatus 1. In one version, the job log 1006 may be expressed as array of character strings of the job names.

The job log 1006 may also include additional information such as a job execution time for functioning as a general job history. However, in the present exemplary embodiment, such additional information is not used.

The job process table 1007 stores correspondence relationships between job type (i.e., a type of function included in the image processing apparatus 1) and the process, as illustrated for example in FIG. 9. The job process table 1007 may be stored in either the HDD 8, the HDD 9, or the flash memory 66 of the image processing apparatus 1. The job process table 1007 is an example of job process information which associates the functions of the image processing apparatus 1 and the processes. A single job may be executed by coordinating a plurality of processes. Since the job process table 1007 can be uniquely determined when a module structure of the system is designed, the job process table 1007 may be created during the design and stored as static information in the system.

The log analysis 1004 can specify the job types which are frequently executed by referring to the job log 1006. Further, the log analysis 1004 can specify the processes to execute the frequently executed jobs by referring to the job process table 1007, specify these processes as processes to be frequently executed, and register these processes in the high-frequency process list 1003. Thus, the high-frequency process list 1003 can indicate information about an execution frequency of the processes.

Next, processing in which the process 1001, which is started up for the image processing apparatus 1 to execute a job, acquires a memory region will be described.

Figure 4:
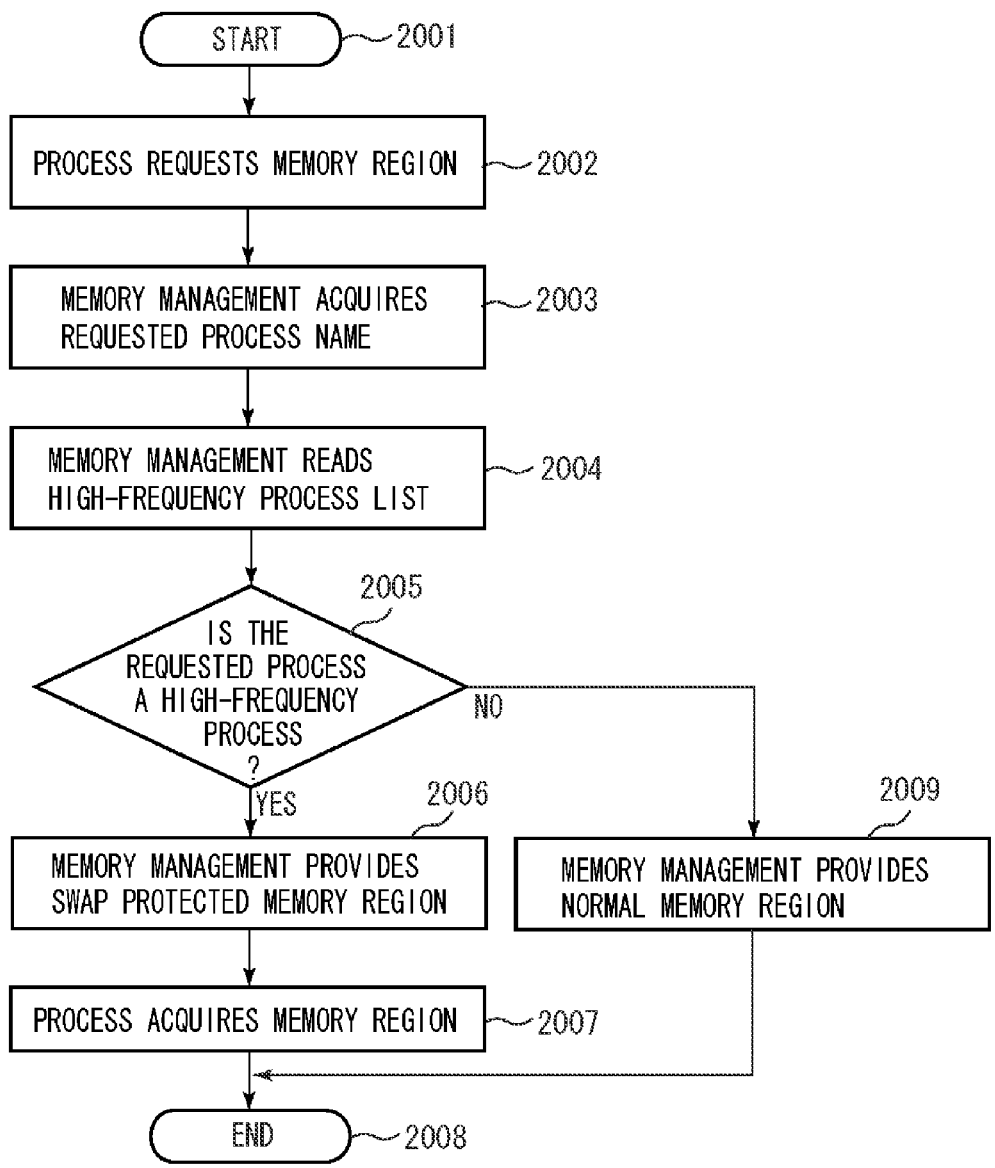
FIG. 4 is a flowchart illustrating an example of memory region acquisition processing which is executed by a CPU of the image processing apparatus.

FIG. 4 is a flowchart illustrating an example of memory region acquisition processing of a process which may be executed by the CPU 33 of the image processing apparatus 1.

Processing in the flowchart is started in step 2001. Since the memory region can be acquired at arbitrary timing in which processes and jobs are operating, processing of the flowchart as shown may start at arbitrary timing in which a process is activated.

In step 2002, the process 1001 requests the memory region from the memory management 1002.

In step 2003, the memory management 1002 from which the memory region is requested acquires the process name of the requested process. The process name may be acquired as data in a form of a character string.

In step 2004, the memory management 1002 reads the high-frequency process list 1003. The high-frequency process list 1003 may have an array of character string data.

In step 2005, the memory management 1002 determines whether the process 1001 which requested the memory region in step 2002 is a high-frequency process. More specifically, if the process 1001 which requested the memory region in step 2002 is registered in the high-frequency process list 1003 acquired in step 2003, the memory management 1002 determines that the process 1001 is a high-frequency process. If the process 1001 is not registered in the high-frequency process list 1003, the memory management 1002 determines that the process 1001 is not a high-frequency process. In one version, the processing may confirm whether the character string obtained in step 2003 matches with the character string data in the array obtained in step 2004.

In step 2005, if it is determined that the process 1001 which requested the memory region in step 2002 is a high-frequency process (YES in step 2005), the processing proceeds to step 2006.

In step 2006, the memory management 1002 assigns a high-speed memory, and provides the assigned memory region to the process 1001.

On the other hand, in step 2005, if it is determined that the process 1001 which requested the memory region in step 2002 is not a high-frequency process (NO in step 2005), the processing proceeds to step 2009.

In step 2009, the memory management 1002 assigns a low-speed memory, and provides the assigned memory region to the process 1001.

In step 2007, the process 1001 acquires the memory region provided from the memory management 1002.

In step 2008, the process 1001 can finish the memory region acquisition processing, for example provided that the memory region acquisition is successful.

Thus, the process 1001 can secure the region in the DRAM 38, and the CPU 33 can execute the process 1001.

According to the above described processing, the process 1001 does not need to switch the processing according to whether the acquired memory region is swap restricted or not, and can use the memory region which is automatically set based on the circumstances.

Next, the processing in which the process 1001 which is executed by the CPU 33 generates the job log along with the execution of the job by the image processing apparatus 1 will be described.

Figure 5:
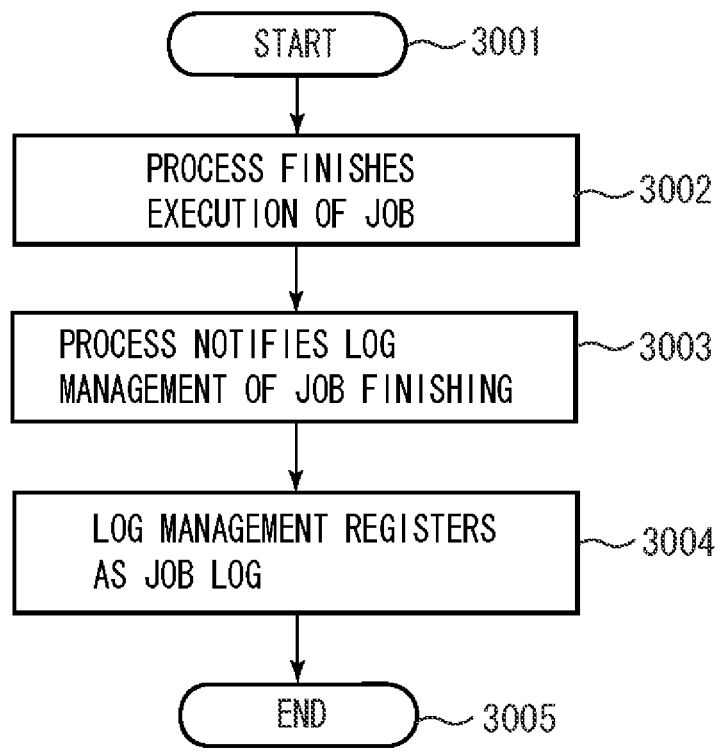
FIG. 5 is a flowchart illustrating an example of processing for generating a log which is executed by the CPU of the image processing apparatus.

FIG. 5 is a flowchart illustrating an example of processing in which a process executed by the CPU 33 of the image processing apparatus 1 creates a log. The processing in the flowchart may be executed by the CPU 33.

Processing in the flowchart is started in step 3001. Since the execution of the job can be performed at arbitrary timing, the process which is started up along with the job may also be executed at arbitrary timing, and the flow of the log generation processing may also be executed at arbitrary timing.

In step 3002, the process 1001 finishes the execution of the job.

In step 3003, the process 1001 notifies the log management 1005 that the job is finished. In one version, the process 1001 may send notification to the log management 1005 at the end of the job processing, so that notification identifying which job was executed can be sent.

In step 3004, the log management 1005 records in the job log 1006 the log (history) of the job executed by the image processing apparatus 1 based on the job finish notification from the process 1001. The job log 1006 can include the list of information as illustrated in the example shown in FIG. 8. The job log 1006 may be recorded in the HDD 8 or 9.

In step 3005, the processing of the flowchart may be finished, for example provided that the job log is recorded.

Next, log analysis processing in which the log analysis 1004 creates the high-frequency process list will be described.

Figure 6:
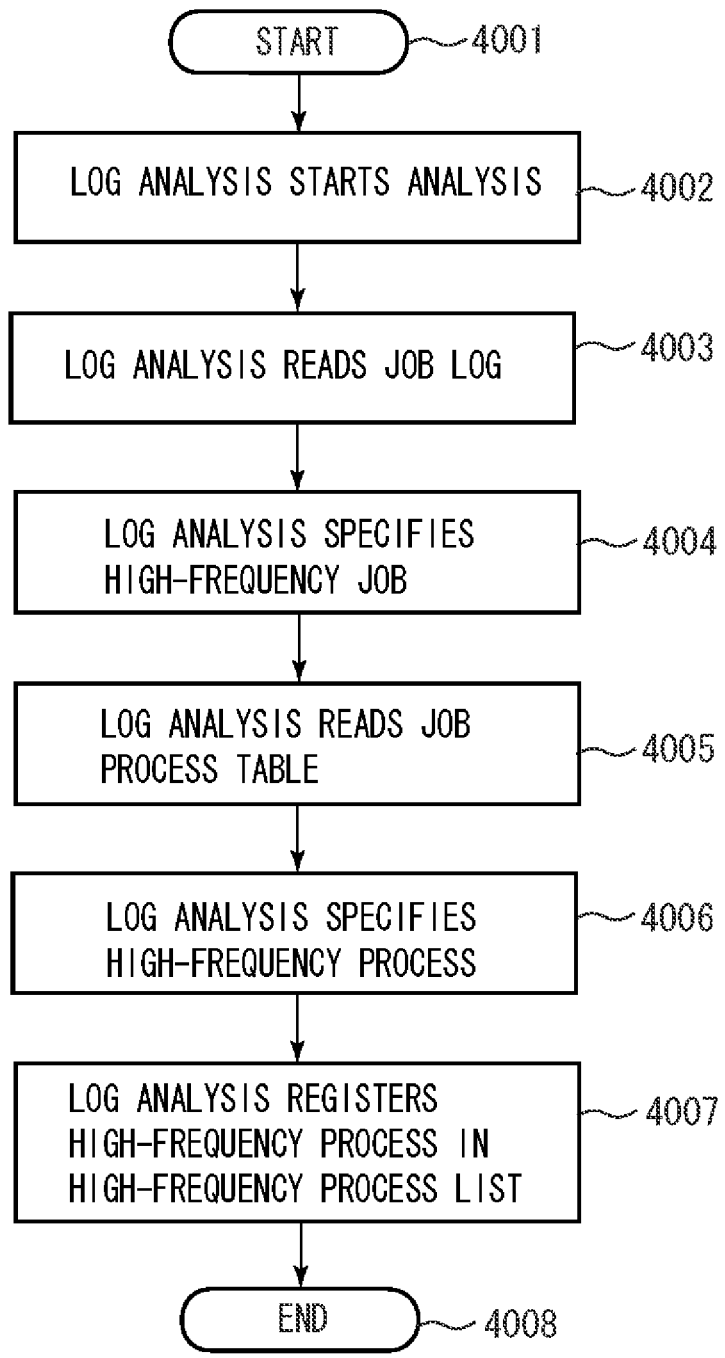
FIG. 6 is a flowchart illustrating an example of high-frequency process list generation processing in the image processing apparatus.

FIG. 6 is a flowchart illustrating an example of high-frequency process list generation processing in the image processing apparatus 1 of the present exemplary embodiment. The processing in the flowchart may be executed by the CPU 33.

Processing in the flowchart is started in step 4001. The processing in the flowchart may start at pre-set timing such as at predetermined time intervals, and after a predetermined number of jobs are executed. The timing may be set by, for example, the user or the administrator of the image processing apparatus 1. Settings may be stored in the HDD 8, the HDD 9, or the flash memory 66. Alternatively, other than pre-set timing, execution of the flowchart may be started based on an instruction received from the user or administrator via the operation unit 7.

In step 4002, the log analysis 1004 starts the analysis processing of the job log 1006.

In step 4003, the log analysis 1004 reads the job log 1006.

In step 4004, the log analysis 1004 tallies the read job log 1006, and specifies the job type having a high execution frequency. In one version, character strings of the job names indicating the job type may be stored in the job log 1006, and the job log can be tallied by counting the number of times all of the job names appear in the job log 1006. Further, the log analysis 1004 specifies the high-frequency jobs from the tallied results of the job log 1006. As an example of a method for specifying the high-frequency jobs, the jobs whose number of appearances is equal to or greater than a predetermined number among the tallied results of the job log, may be specified as the high-frequency jobs. Another method may be to specify the high-frequency jobs as the jobs which are at the top, or which are equal to or above a predetermined ranking, among the tallied results of the job log.

In step 4005, the log analysis 1004 reads the job process table 1007. In step 4006, the log analysis 1004 specifies the processes corresponding to the high-frequency job to determine the high-frequency processes. In one version, the processing may be performed by searching for the job name of the high-frequency job specified in step 4004 in the job process table 1007 which was read in step 4005, and acquiring one or more process names which correspond to the job name. Then, in step 4007, the log analysis 1004 registers the high-frequency processes specified in step 4006 in the high-frequency process list 1003. In one version, the high-frequency process list 1003 may be overwritten with the one or more process names specified in step 4006. The processing may then be ended in step 4008.

FIG. 7 illustrates an example of the high-frequency process list 1003. In the high-frequency process list 1003, unique process names in the system may be expressed as the character string data in a list form.

FIG. 8 illustrates an example of the job log 1006 according to the present exemplary embodiment.

In the job log 1006, the job name uniquely specifying the job type in the image processing apparatus 1 and the time at which the job was executed may be expressed as a character string in a list form. In the example of FIG. 8, copy jobs (copy) 802 and 808, a facsimile transmission job (fax_tx) 804, and a print job (pd1) 806 are recorded as the job log. If another job type is executed by the image processing apparatus 1, a job name other than those illustrated in FIG. 8 can be recorded in the job log 1006.

FIG. 9 illustrates an example of the job process table 1007 in the present exemplary embodiment.

In the job process table 1007, the correspondence relationship between the job name uniquely specifying the job type in the image processing apparatus 1, and the unique process names in the image processing apparatus 1 which are for executing the job specified by the job name, may be respectively expressed as character strings in a table form. In the example of FIG. 9, a copy job (copy) and a print job (print) are registered as the job names, and as the process names corresponding to the copy job, for example, three processes, a scan process, a print process, and an imaging process, are recorded. While it is not illustrated in FIG. 9, the correspondence relationship between the jobs and processes for various job types, other than the copy job and the print job, which can be executed by the image processing apparatus 1, may also be recorded in the job process table 1007.

Thus, according to the present exemplary embodiment, frequently executed processes can be specified based on the frequency of each job type executed by the image processing apparatus 1, and a high-speed memory region may be provided for the specified processes. As a result, since such processes can be restricted to prevent swapping out, a decrease in the throughput of the image processing apparatus 1 can be prevented. Further, even when a change occurs in the frequency of each job type executed based on the usage of the image processing apparatus 1, the high-frequency processes can be appropriately specified based on the change, so that the processes which are to be provided with a high-speed memory region can be dynamically changed. As a result, the user may be able to use the functions of the image processing apparatus 1 at an optimum throughput based on a memory management function optimized according to usage. Accordingly, aspects of the present invention may provide an image processing apparatus which prevents reduction of throughput by dynamically changing the processes which are restricted to prevent swapping out.

In the first exemplary embodiment, a configuration is described in which the high-frequency processes are specified based on the execution frequency of each job type executed by the image processing apparatus 1.

In an office, image processing apparatuses are often shared by a plurality of users. However, among the plurality of functions (i.e., job types) provided by the image processing apparatus, a function which is frequently used may often be different for each user. This is because the work contents that each user is responsible for are different, so that functions requested by the users for the image processing apparatus will be different for each user.

In a second exemplary embodiment, a configuration will be described in which the high-frequency processes are optimized for each of a plurality of users who share the image processing apparatus 1.

In the second exemplary embodiment, the hardware configuration of the image processing apparatus 1 and the program configuration relating to the memory management include at least the same structures as illustrated in FIGS. 1 and 2. When the image processing apparatus 1 of the second exemplary embodiment includes structures which are not illustrated in FIGS. 1 and 2, it will be described on a case-by-case basis.

The user may operate the operation unit 7 to input user information (e.g., a user ID and password). The image processing apparatus 1 receives the user information via the panel I/F 62, and the CPU 33 executes log-in processing (e.g., user authentication processing) which checks the user information. Then, the user uses the functions of the MFP. When the image processing apparatus 1 performs the log-in processing, the image processing apparatus 1 can query an external directory server and receive an authentication result from the directory server. Further, instead of the user using the operation unit 7 to input the user information, an integrated circuit (IC) card on which the user information is recorded may be read in an IC card reader connected to the I/O control unit 51.

Since the login information can be included in data describing the jobs, after login the login information can be referred to at an arbitrary processing step.

The process 1001 can identify which user executes the job to be executed by referring to the login information.

Figure 10:
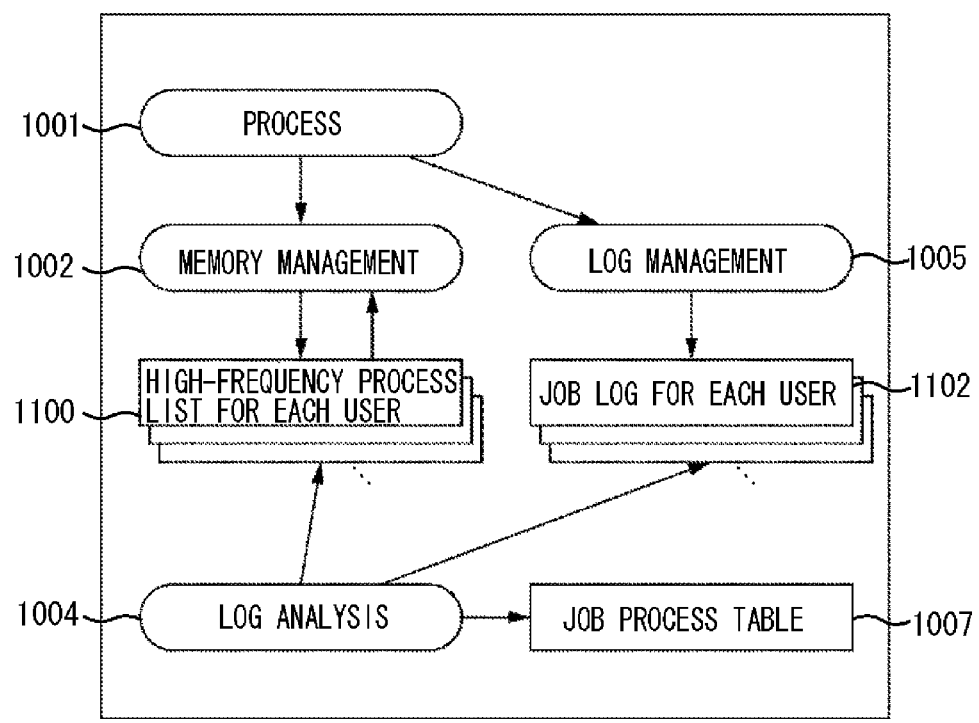
FIG. 10 illustrates an example of a program module relating to memory control of an image processing apparatus in a second exemplary embodiment of the present invention.

FIG. 10 illustrates an example of a program module relating to memory control of the image processing apparatus 1 of the second exemplary embodiment. In FIG. 10, components which are the same as in FIG. 3 are denoted with the same reference numerals as in FIG. 3, and a description thereof is omitted.

In FIG. 10, a difference from FIG. 3 is that a job log for each user 1102 is included instead of the job log 1006. The job log for each user 1102 may manage the job log for each user who is logged in to the image processing apparatus 1.

Further, in FIG. 10, a high-frequency process list for each user 1100 is included instead of the high-frequency process list 1003 of FIG. 3. The high-frequency process list for each user 1100 may manage the high-frequency processes that are executed at a high frequency for each user based on results of analysis of the job log for each user 1102 performed by the log analysis 1004.

If a user newly logs into the image processing apparatus 1, the job log for the user may be newly added to the job log for each user 1102, and the high-frequency process list for the user may be newly added to the high-frequency process list for each user 1100.

When the user logs in, the CPU 33 can record the execution history (e.g., log) of the jobs identified from the user information in the job log for each user 1102 managed for each user, and the results of the analysis of the job log for each user 1102 may be recorded in the high-frequency process list for each user 1100.

The high-frequency process list which may be used when the memory region is assigned during process start-up is the high-frequency process list of the user who logs in when that process is started up from among the high-frequency process lists for each user 1100. This is referred to as a valid high-frequency process list.

Memory region acquisition processing of the process to be executed by the CPU 33 of the image processing apparatus 1 in the second exemplary embodiment will be described.

Although the memory region acquisition processing in the second exemplary embodiment is generally similar to the example processing of the flowchart of FIG. 4 in the first exemplary embodiment, the differences with the flowchart of FIG. 4 will now be described.

In the second exemplary embodiment, in step 2004, the memory management 1002 reads the valid high-frequency process list which is the high-frequency process list corresponding to the user who logs in when the process is started and the memory region is acquired. As a result, the high-frequency processes which match a usage style particular to the logged-in user of the image processing apparatus 1 can be specified, so that the memory management 1002 can assign the high-speed memory for such processes.

Next, the job log generation processing of the image processing apparatus 1 in the second exemplary embodiment will be described.

Although the job log generation processing in the second exemplary embodiment is generally similar to the example processing of the flowchart of FIG. 5 in the first exemplary embodiment, the differences with the flowchart of FIG. 5 will be described.

In the second exemplary embodiment, in step 3003, the process 1001 notifies the log management 1005 that the job is finished, and sends the user information about which user executes the job, namely the user who is logged in the image processing apparatus 1 when the job is executed.

Further, in step 3004, the log management 1005 records the notified job finish log in the job log of the user corresponding to the notified user information in the job log for each user 1102.

Next, using the flowchart of FIG. 11, an example of a flow of updating the valid high-frequency process list when the user logs in will be described. Each step in the flowchart of FIG. 11 may be executed by the CPU 33 of the image processing apparatus 1.

The processing is started in step 5001.

In step 5002, the CPU 33 receives an operation for login from the user, specifies the user information, and performs login processing. The login processing may be executed at arbitrary timing while the image processing apparatus 1 is operating.

In step 5003, the CPU 33 specifies the high-frequency process list corresponding to the logged-in user from among the high-frequency process list for each user 1100.

In step 5004, the CPU 33 defines the high-frequency process list specified in step 5003 as the valid high-frequency process list.

In step 5005, the flow for updating the valid high-frequency process list is finished, for example provided that the valid high-frequency process list is updated.

Figure 11:
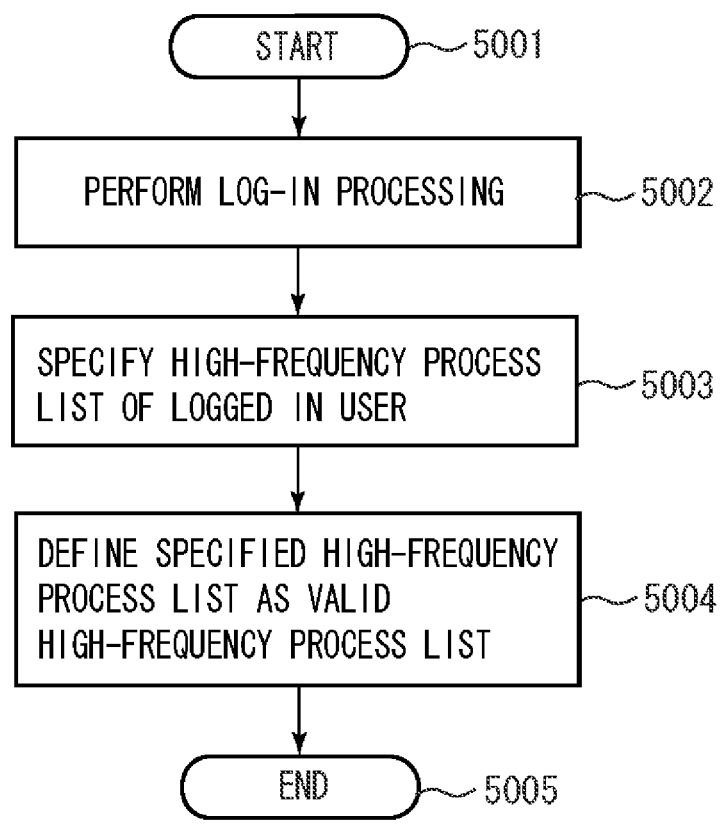
FIG. 11 is a flowchart illustrating an example of processing for updating a valid high-frequency process list.

By executing the flowchart of FIG. 11, the valid high-frequency process list suited to the logged-in user can be specified. Further, the memory management 1002 can specify the high-frequency processes by referring to the valid high-frequency process list, so that these high-frequency processes can be assigned to the memory region (e.g., high-speed memory region) in which swapping out is not allowed. As a result, the image processing apparatus 1 may be able to execute the job at the optimum throughput based on the memory management function optimized to the logged-in user.

Aspects of the present invention may be realized by supplying a computer-readable medium having a control program and/or computer-executable instructions for realizing various functions of the exemplary embodiments to a system or an apparatus either directly or remotely, and reading and executing the supplied program code and/or computer-executable instructions by a computer or an image processing apparatus included the system or apparatus.

Therefore, the computer-readable medium having the program code of the control program and/or computer-executable instructions which may be provided in the computer or the apparatus to realize the functions and processing according to aspects of the present invention in the computer or the apparatus, may realize embodiments of the present invention.

The program and/or computer-executable instructions can be any one of an object code, a program executed by an interpreter, script data supplied to an OS and the like.

Examples of the computer-readable storage medium having the program and/or computer-executable instructions stored thereon may include, but are not limited to, a flexible disk, a hard disk, an optical disk, a magneto optical disk (MO), a compact disc read only memory (CD-ROM), a CD-recordable (CD-R), a CD-rewritable (CD-RW), a magnetic tape, a non-volatile memory card, a ROM, a digital versatile disk (DVD-ROM, DVD-R), a universal serial bus (USB) memory and the like.

In addition, the program and/or computer-executable instructions may be downloaded using a browser of a client computer to connect to the Internet or an Internet web page. That is, a computer program and/or computer-executable instructions, or a compressed file containing an auto-install function according to aspects of the present invention, can be downloaded to a computer-readable storage medium, such as a hard disk. Further, aspects according to the present invention may be realized by dividing the program code that constitutes a program and/or the computer-executable instructions into a plurality of files, and downloading each of the files from different web sites. Thus, a server which allows a plurality of users to download the program files for realizing functional processing according to aspects of the present invention by a computer, may constitute an embodiment of the present invention.

Furthermore, a program and/or computer-executable instructions can be encrypted, stored on the storage medium, such as a CD-ROM, and distributed to a user, according to aspects of the present invention. According to one version, only a user who satisfies certain conditions may be allowed to download key information for deciphering the encryption from a web site via the Internet or an intranet. The encrypted program and/or computer-executable instructions may be decrypted by the key information and executed to install the program and/or computer-executable instructions on the computer.

Furthermore, functions according to the exemplary embodiments can be realized by having a computer execute a program and/or computer-executable instructions on the computer-readable medium. In addition, an OS operating on the computer may perform all or a part of the actual processing based on instructions of the program and/or computer-executable instructions. Functions according to the exemplary embodiments may be realized in such a case as well.

In addition, a program and/or computer-readable instructions read from the storage medium may be written into a memory that is provided on a function expansion board which is inserted into a computer or a function expansion unit connected to the computer. Based on an instruction of the program and/or computer-executable instructions, a CPU provided on the function expansion board or the function expansion unit may perform all or a part of the actual processing.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2008-160769 filed Jun. 19, 2008, which is hereby incorporated by reference herein in its entirety.

What is claimed is:

1. An image processing apparatus which is capable of performing a plurality of jobs, the image processing apparatus comprising:
    a program execution unit capable of executing at least one of a plurality of programs for the image processing apparatus to perform a job, each of the plurality of jobs corresponding to at least one of the plurality of programs;
    a memory management unit configured to secure a storage region in a first storage device for the program execution unit to execute the program;
    a save unit configured to save to a second storage device, information stored in the storage region secured by the memory management unit in the first storage device;
    a history recording unit configured to record a job history relating to performing of the job each time the image processing apparatus performs the job;
    an associated information storage unit configured to store association information indicating a correspondence relationship between each of the plurality of jobs and each of the plurality of programs; and
    a save restriction unit configured to restrict saving of information in the storage region of the first storage device secured to execute the program associated with a job which is specified based on a job performing frequency obtained from the job history recorded by the history recording unit, to the storage region of the second storage device, by referring to the associated information storage unit.

2. The image processing apparatus according to claim 1, wherein the memory management unit secures a plurality of storage regions in the first storage device respectively corresponding to the plurality of programs executed by the program execution unit, and the save restriction unit is configured to restrict saving of information in the storage region that is secured to execute the job relating to the specified job among the plurality of storage regions to the storage region of the second storage device.

3. The image processing apparatus according to claim 1, further comprising:
    a program frequency information generation unit configured to generate program execution frequency information which indicates a program execution frequency based on the job history recorded by the history recording unit and the associated information stored by the associated information storage unit,
    wherein the save restriction unit restricts saving of information in the storage region of the first storage device secured to execute the program which is specified based on the program execution frequency information to the storage region of the second storage device.

4. The image processing apparatus according to claim 3, wherein the program frequency information generation unit updates the program execution frequency information at predetermined timing.

5. The image processing apparatus according to claim 4, further comprising:
a user authentication unit configured to authenticate a user who logs into the image processing apparatus,
wherein the history recording unit records information specifying the user who is authenticated and instructed by the user authentication unit to execute a job, as a history relating to job execution, and
the program frequency information generation unit updates the program execution frequency information based on the job history relating to the authenticated user and the associated information each time a user is authenticated by the user authentication unit.

6. The image processing apparatus according to claim 1, wherein the first storage device is a main storage device and the second storage device is a secondary storage device.

7. A method for managing memory of an image processing apparatus which is capable of performing a plurality of jobs, the image processing apparatus comprising a program execution unit capable of executing at least one of a plurality of programs for performing a job, each of the plurality of jobs corresponding to at least one of the plurality of programs, and an associated information storage unit configured to store association information indicating a correspondence relationship between each of the plurality of jobs and each of a plurality of programs, the method comprising:
securing a storage region in a first storage device for the program execution unit to execute the program;
saving, in a second storage device, information stored in the storage region secured in the first storage device;
recording a job history relating to performing of the job each time the job is performed; and
restricting saving of information in the storage region of the first storage device secured to execute the program associated with a job which is specified based on a job performing frequency obtained from the job history, to the storage region of the second storage device, by referring to the associated information storage unit.

8. A non-transitory computer-readable storage medium having computer-executable instructions stored thereon for causing image processing apparatus which is capable of performing a plurality of jobs, to perform a method for managing memory, the image processing apparatus having a program execution unit capable of executing at least one of a plurality of programs for performing a job, each of the plurality of jobs corresponding to at least one of the plurality of programs, and an associated information storage unit configured to store association information indicating a correspondence relationship between each of the plurality of jobs and each of a plurality of programs, the non-transitory computer-readable storage medium comprising:
computer-executable instructions for securing a storage region in a first storage device for the program execution unit to execute the program;
computer-executable instructions for saving, in a second storage device, information stored in the storage region secured in the first storage device;
computer-executable instructions for recording a job history relating to performing of the job each time the job is performed; and
computer-executable instructions for restricting saving of information in the storage region of the first storage device secured to execute the program associated with a job which is specified based on a job performing frequency obtained from the job history, to the storage region of the second storage device, by referring to the associated information storage unit.

* * * * *